United States Patent [19]

Arai et al.

[11] 4,138,369

[45] Feb. 6, 1979

[54] PRESSURE SENSITIVE CONDUCTOR AND METHOD OF MANUFACTURING THE SAME

[75] Inventors: Kozo Arai; Shiomi Fukui; Masaki Nagata; Teizo Kotani, all of Yokohama, Japan

[73] Assignee: Japan Synthetic Rubber Co., Ltd., Tokyo, Japan

[21] Appl. No.: 836,414

[22] Filed: Sep. 26, 1977

[30] Foreign Application Priority Data

Oct. 2, 1976 [JP] Japan ................................. 51-118753
Feb. 21, 1977 [JP] Japan ................................. 52-17978

[51] Int. Cl.$^2$ ............................................. H01B 1/02
[52] U.S. Cl. .................................... 252/512; 252/513; 252/514; 252/520
[58] Field of Search ............................... 252/512–514, 252/520; 260/37 SB

[56] References Cited

U.S. PATENT DOCUMENTS

| | | | |
|---|---|---|---|
| 3,146,799 | 9/1964 | Fekete | 260/37 SB X |
| 3,334,067 | 8/1967 | Weyenberg | 260/37 SB X |
| 4,028,276 | 6/1977 | Harden et al. | 252/511 X |

*Primary Examiner*—Benjamin R. Padgett
*Assistant Examiner*—E. Suzanne Parr
*Attorney, Agent, or Firm*—Cooper, Dunham, Clark, Griffin & Moran

[57] ABSTRACT

A pressure sensitive conductor which is made by mixing a silicone rubber, electrically conductive metal particles, and at least one compound selected from the group consisting of monoalkyl, dialkyl, and trialkyl titanate compounds, molding, and curing the same. Where a monoalkyl titanate compound is used, filler-containing silicone rubber may preferably be used.

21 Claims, 2 Drawing Figures

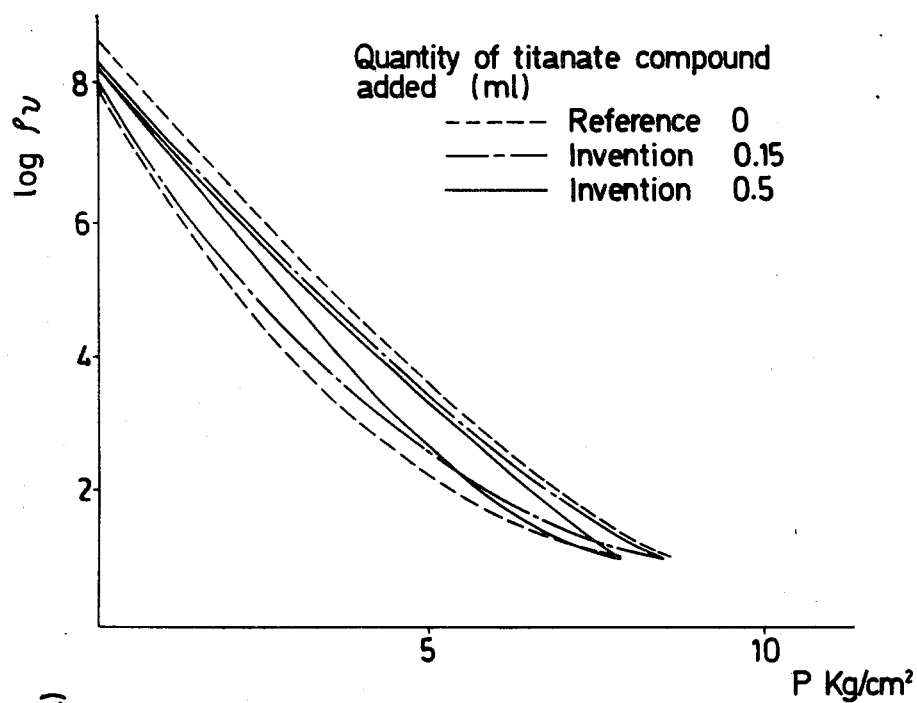
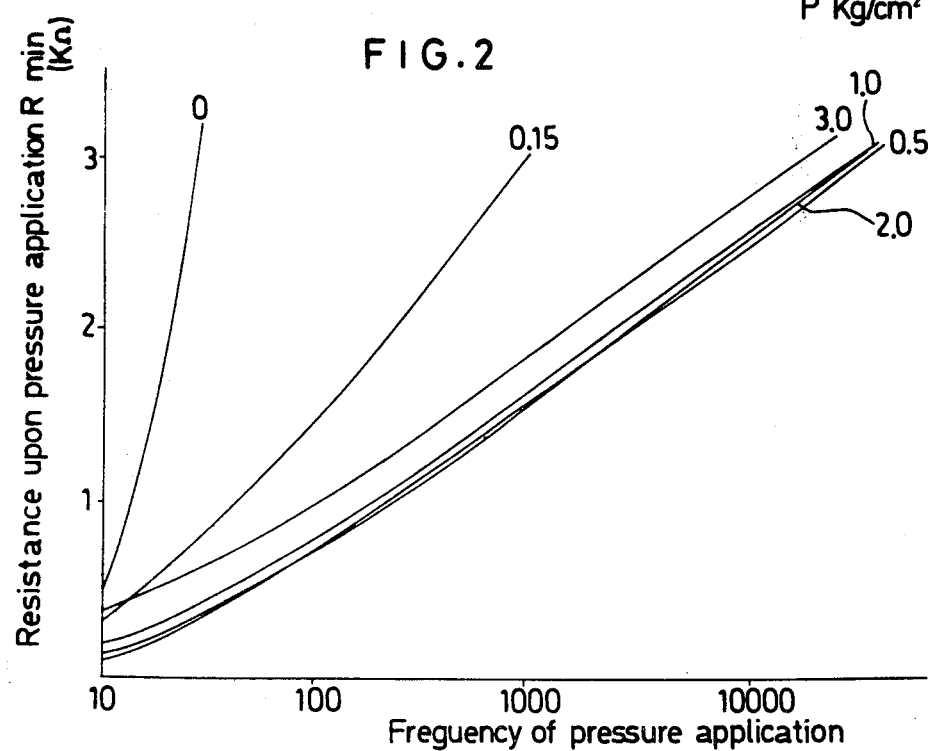

PRESSURE SENSITIVE CONDUCTOR AND METHOD OF MANUFACTURING THE SAME

This invention relates to pressure sensitive conductors (or pressure sensitive resistors) of rubber which are rendered conductive or nonconductive in response to the application and release of pressure. The products are characterized by uniform reproducibility of the change in resistance with the application and release of pressure, and also by a high response velocity even when the frequency of repeated pressure application and release is rapid, with substantially negligible change in electrical characteristics. It also relates to methods of manufacturing the same.

Heretofore, resistors or conductive elements made chiefly of rubber and electrically conductive metal have failed to win wide acceptance. This has been attributed to their lack of uniform electrical characteristics and their inadequate mechanical strength or durability (Gule: "Study and Application of Conductive Polymers," Yokogawa Shobo Publishing Co., 1970, p. 108).

It is well known that composite materials, prepared by mixing conductive metal particles in an elastomer, molding and then curing, serve as a pressure sensitive resistors whose volume resistivity ($\rho v$) varies widely with the deformation of the shape (Japanese Patent Publication No. 24061/65 and Patent Application Disclosures Nos. 114798/74 and 116996/75, etc.). Foamed pressure sensitive resistors made essentially of solid rubber and a conductive metal are also known (Japanese Patent Application Disclosure No. 6179/71). Further known is the use of substantially globular silver particles about $200\mu$ in size in the fabrication of pressure sensitive resistors (Japanese Patent Publication No. 3019/72), the use of conductive metal particles, coated with silver, tin or the like to a nearly globular contour, for foamed pressure sensitive resistors (Japanese Patent Application Disclosures Nos. 6179/71 and 39097/74), and the employment, for the manufacture of a pressure sensitive resistor, of metal particles made irregular on the surface to attain a large surface area (Japanese Patent Application Disclosures Nos. 6179/71 and 1558899/75) or of conductive particles coated with a semiconductive material (Patent Application Disclosure No. 114798/74).

Nevertheless, the manufacturers producing such pressure sensitive conductors on an industrial scale are but a few in the whole world. This unfavorable reception by the industry has hitherto been attributed to the too great compressive force required for the composite rubbery material to be formed into a conductive, changes in the relation between the pressure applicable to the pressure sensitive resistor and the volume resistivity ($\rho v \Omega cm$) of the resistor with the lapse of time, and undue variations in electrical properties of the resistor with repeated pressure applications. In our further investigations we have found additional serious disadvantages of the existing pressure sensitive conductors. Among the disadvantages are that the relation between the volume resistivity ($\rho v$) and the pressure (P) changes with the length of the cyclic periods in which the conductors are compressed repeatedly, and that if the cycle of repeated pressure application is not long enough, the conductors will delay in electrical response and will exhibit insufficient durability.

The products of this invention substantially alleviate the above mentioned problems.

Thus, it is an object of the present invention to provide, for commercial production, pressure sensitive conductors made of compounded rubber adjusted to an optimum viscosity and having uniform electrical properties with rapid electrical response to repeated application and release of pressure and with very little changes in the electrical properties with the repeated pressure application.

More specifically, an object of the invention is to provide pressure sensitive conductors made by mixing a silicone rubber, a conductive metal particles, and at least one compound selected from the group consisting of monoalkyl, dialkyl, and trialkyl titanate compounds, molding, and curing the same.

Another object of the invention is to provide pressure sensitive conductors made of a mixture of a silicone rubber, conductive metal particles, a dialkyl, and/or trialkyl titanate compound.

Still another object of the invention is to provide pressure sensitive conductors made by mixing, as essential components, a silicone rubber containing a filler, conductive metal particles, and a monoalkyl titanate compound, molding and then curing the same.

The pressure sensitive conductors according to this invention have many advantages over the prior art products. There include, for example, limited hysteresis of resistance during the application and release of pressure, a high electrical response velocity of 1 millisecond or less at the time of pressure application or release, and very little change in the volume resistivity-pressure curve upon repeated pressure application with current supply. These and other advantages make it useful industrially as an element for converting mechanical deformation into a corresponding electrical change.

The actions of the monoalkyl, dialkyl, and trialkyl titanate compounds used in the present invention are not presently completely understood. While the invention should not be limited by theory, it appears possible that these titanate compounds, when added during mixing of the composition according to the invention, adjust the viscosity of the system to a value appropriate for the dispersion of the metal particles, permit the rubber composition to be cured to a structure suited for a pressure sensitive conductor, and restore the structure rapidly to its initial, unstressed condition upon release of the pressure, even after repeated deformation for the passage of a current therethrough. In an attempt to prove these, a very small amount of nickel particles about $100\mu$ in particle size was added to a mixture of a silicone rubber and a dialkyl titanate compound. The whole mixture was molded and cured. Then, the specimen thus cured was allowed to swell in benzene by our previously proposed procedure [Teizo Kotani et al.: "Polymer Networks", Plenum Press, N.Y., (1971), pp. 273-291]. The regions around the nickel particles in the specimen were observed under a birefringence microscope. No unusual phenomenon due to the addition of titanate compound was found. Therefore, it seems that the monoalkyl, dialkyl, or trialkyl titanate compound, when used as a component of the pressure sensitive conductor, would contribute to the formation of the rubber structure and also to the conductivity of rubber in response to pressure application, thus affording a good pressure sensitive conductor. If a tetraalkyl titanate is employed as a component of the invention in place of a mono-, di-, or trialkyl titanate, gelation often takes place during the mixing of the components, making it difficult to produce a pressure sensitive conductor of uniform properties. When a dealcoholized silicone rubber is mixed with the tetraalkyl titanate, the mixture becomes solid in a few minutes so that formation on a commercial basis is no longer possible.

The monoalkyl titanates employed in the present invention are generally represented by the formulas

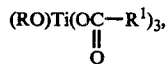

(RO)Ti(O—$R^2$)$_3$, or (RO)Ti(OX—$R^2$)$_3$, in which R is an alkyl group, preferably an alkyl group having from one to four carbon atoms; $R^1$ is a vinyl group, α-alkyl-substituted vinyl group, or an alkyl, aralkyl, or allyl group having from about six to 20 carbon atoms; $R^2$ is an alkyl, aralkyl, or allyl group having from about six to 20 carbon atoms; and X is

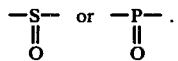

Useful monoalkyl titanates for the invention include, for example, isopropyl triisostearoyl titanate, isopropyl trilauryl titanate, isopropyl trimyristyl titanate, isopropyl dimethacryloyl isostearoyl titanate, isopropyl tri(dodecylbenzenesulfonyl) titanate, isopropyl isostearoyl diacryloyl titanate, isopropyl tri(diisooctylphosphate) titanate, isopropyl trimethacryloyl titanate, isopropyl tri(dioctylpyrophosphate) titanate, isopropyl triacroyl titanate, isopropyl tri(dioctylphosphite) titanate, butyl triisostearoyl titanate, and ethyl triisostearoyl titanate.

Dialkyl and trialkyl titanates can be represented by the general formula

where n is 2 or 3, and R is an alkyl group, preferably an alkyl group having from one to four carbon atoms because of good reactivity and dispersibility in the silicone rubber. The ligand groups ($R^3$O—) other than the alkoxy group (RO—) are required to be less hydrolyzable than the alkoxy group-titanium bond. In the formula, $R^3$ is a triethanolamine residue, acryloyl or methacryloyl, or an acyl group, aroyl group, or alkylbenzenesulfonyl group, alkyl having from six to 20 carbon atoms, preferably 10 to 20 carbon atoms, and derivatives thereof. Where n is 2, these ligand groups ($R^3$O—) may or may not be the same.

Typical dialkyl titanate compounds useful for the invention include bis(triethanolamine)diisopropyl titanate, bis(triethanolamine)dibutyl titanate, bis(triethanolamine) diethyl titanate, bis(triethanolamine)dimethyl titanate, diisopropyldilauryl titanate, diisopropyl laurylmyristyl titanate, diisopropyl distearoyl titanate, diisopropyl stearoylmethacryloyl titanate, diisopropyl diacryloyl titanate, diisopropyl didodecylbenzenesulfonyl titanate, and diisopropyl isostearoyl-4-aminobenzoyl titanate.

Examples of trialkyl titanate compounds are triisopropyl acryloyl titanate, triethyl methacryloyl titanate, triisopropyl myristyl titanate, tributyl dodecylbenzenesulfonyl titanate, triisopropyl stearoyl titanate, and triisopropyl isostearoyl titanate.

These titanate compounds may, of course, be used in a combination of two or more.

Of the monoalkyl, dialkyl, and trialkyl titanate compounds for use in the present invention, the dialkyls and trialkyls in particular give good results.

The monoalkyl, dialkyl, or trialkyl titanate compound is desirably used in an amount from about 0.1 to 3% of the total volume of the composition. With an amount which is appriciably less than 0.1% the compound will have reduced beneficial effect, and an amount appriciably exceeding 3% tends to interfere, with the curing reaction of silicone rubber.

Useful conductive metal particles for this invention are those commonly employed for the manufacture of pressure sensitive conductors, and include, for example particles of silver, copper, cobalt, nickel, brass, iron, chromium, titanium, platinum, gold, aluminum, zinc, or their alloys.

From the viewpoint of price as well as of their resistance to oxidation, the particles of silver, copper, nickel, cobalt, chromium, brass, iron, and their alloys are especially desirable. Where the pressure sensitive conductor during the course of manufacture will be subjected to the action of magnetic fields, cobalt, nickel, iron or their alloys will give satisfactory results.

The size of such conductive metal particles may be within the usual range, between 0.1 and 200μ. Since too fine particles pose an oxidation problem, a particle size of over 1 micron is preferred. Conversely too large particles tend to be released from the rubber matrix. Therefore the preferred particle size has the upper limit of 150μ.

The amount of the conductive metal particles to be used in practicing the invention is desirably between 8 and 35% by volume. If the amount is notably less than 8% the product tends to develop insulation characteristic. If the amount is appriciably over 35% the product tends to be a conductor itself without the application of pressure.

The presently preferred rubber for use in the invention is silicone rubber. Pressure sensitive conductors formed of diene rubber are limited in applications because of inadequate resistance to oxidation, heat, and weathering. None-diene rubber except for silicone rubber gives a pressure sensitive conductors which are relatively slow in electrical response and thereby fail to achieve the objects of the invention.

Preferably the silicone rubber employed in the present invention is of any type provided its viscosity is not more than $10^5$ poises at a rate of strain of $10^{-1} sec^{-1}$. It may be of the condensation reaction, addition reaction, or vinyl group-containing type.

The silicone rubber may be cured by conventional method using commercially available cross-linking agent and cross-linking catalyst suited for the rubber.

Silicone rubbers for use in the invention may contain such commonly employed additives as pigments, coloring agents, stabilizers, foaming agents, and/or silicone oils. They may also contain fillers such as colloid silica, silica aerogel, kaolin, mica, talc, wollastonite, calcium silicate, aluminum silicate, chalk, calcium carbonate, magnesium carbonate, iron oxide, or alumina, in an amount of up to about 45% on the basis of the rubber volume. Especially where a monoalkyl titanate is used, it is desirable to add a filler to the silicone rubber.

High elongation at break is one of the essential requirements of pressure sensitive conductors. The conductors of this invention manifest this property to a very high degree. It has been observed, in accordance with the invention, that the modulus of the products can be improved by increasing the proportion of the filler to the silicone rubber, without impairing the elongation at break properties. Further, it has been found most unexpectively, that the addition of more filler to silicone rubber results in a pressure sensitive conductor which is rendered conductive by subjection to a low pressure, even though the proportion of the conductive metal particles has been decreased. While conductive metal particles generally fail to give added strength to the resulting pressure sensitive conductor, the reinforcing filler used in accordance with the invention improves the physical properties of the conductor and permits a reduction of cost. For better physical properties of the conductors of the invention, the amount of filler is preferably up to about 45% by volume on the basis of the total volume of the silicone rubber. If the amount appreciably exceeds 45% by volume, the conductor will often manifest unreliable elastic response to the application and release of presume.

According to this invention, a silicone rubber, conductive metal particles, mono-, di-, or trialkyl titanate, and the like are mixed, the mixture is molded, and then the resultant is cured in the usual manner.

In this invention, the method for mixing a silicone rubber, conductive metal particles and titanate compounds is no restricted. For example, it can be adopted the methods which comprising after mixing a silicon rubber and metal particles, adding a titanate compounds to said mixture and then further mixing them, the method which comprising mixing a silicon rubber and metal particles and adding a titanate compounds during the mixing of said materials to said mixture, the method which comprising premixing a titanate compounds and metal particles and then adding said mixture to a silicon rubber and further mixing them, and the method which comprising mixing a silicon rubber and titanate compounds and then adding a metal particles to the resulting mixture and further mixing them.

The titanate proves more effective and easier for process operation when it is added during mixing of a silicone rubber with conductive metal particles than when applied as a coat on the conductive particles.

In this way pressure sensitive conductors which exhibit great elongation at break are quick to respond electrically to deformation, and undergoes little change in electrical properties with repeated deformation is provided on an industrial scale. The pressure sensitive conductors of the invention have many possible applications, such as data input devices of electronic computers, explosionproof switches, mat switches, robot hands, microswitches, and pressure sensors.

In the accompanying drawing:

FIG. 1 is a graph indicating the electrical hystereses of specimens in Example 1 and in Reference Example 1; and FIG. 2 is a graph illustrating the relations between the changes in resistance upon application of pressure and the frequency of pressure application on the specimens of Example 1 and Reference Example 1.

The following non-limiting examples are given by way of illustrations only.

EXAMPLE 1

On a twin rotor mixer having a capacity of 100 ml were mixed about 80% by volume (104 g) of a condensation reaction type silicone rubber ("KE12RTV" made by Shin-etsu Chemical Industry Co.) with about 20% by volume (168 g) of nickel particles (hydrogen-pressure-reduction nickel particles, manufactured by Sherritt Gordon Co.) about 20$\mu$ in particle size for 5 minutes. Next, 16 drops of a cross-linking catalyst (of Shin-etsu Chemical) for the silicone rubber was added and mixed together for 1 minute. To this mixed system was added bis(triethanolamine) diisopropyl titanate (made by Alfa Chemical Co.) (sp. gr. 1.2) in varying amounts as shown in Table 1. After mixing for 5 minutes, each mixture was placed in a 1-millimeter-deep mold and allowed to stand for 1 full day. The pressure sensitive conductors thus formed were heated at 120° C. for 1 hour to complete cross-linking.

As Reference Example 1, a pressure sensitive conductor was obtained in the same manner as described in Example 1 except that the titanate compound was not added to the composition.

From the sheets of Example 1 and Reference Example 1 thus obtained, test pieces were cut out by a circular cutter so that each piece had a surface area of one square centimeter. These test pieces were subjected to varying pressures (kg/cm$^2$) and their volume resistivities ($\rho v \Omega$.cm) after the lapse of 30 seconds were measured. Some of the results obtained are shown in FIG. 1. In the graph log $\rho v$ is plotted as ordinate and P as abscissa. At the point of time where log $\rho v$ is 1, the pressure reduction was started at the same rate as at the pressure application. Then, from the relation of log $\rho v$ − P, the electrical hysteresis (%) was determined for the area defined by the log $\rho v$ − P curve during pressure application and the line where the log $\rho v$ = 1.

Table 1

| Results of measurements of Example 1 and Reference Example 1 | | | |
|---|---|---|---|
| Qty of titanate compound of the invention added (ml) | p*[1] (kg/cm$^2$) | Electrical hysteresis (%) | Frequency of effective follow-ups[2] |
| Ref Ex 1   0 | 5.7 | 34 | 27 |
| Ex. 1   0.15 | 5.5 | 22 | 1 × 10$^3$ |
| 0.5 | 5.4 | 12 | 4 × 10$^4$ |
| 1.0 | 5.4 | 13 | 3.5 × 10$^4$ |
| 2.0 | 5.0 | 13 | 3.7 × 10$^4$ |
| 3.0 | 5.7 | 18 | 2 × 10$^4$ |

Notes:
[1]Pressure required to be applied to the pressure sensitive conductor so that its volume resistivity ($\rho v$) reached 10$^3 \Omega$ · cm (in kg/cm$^2$).
[2]Number of times that the electrical properties of the pressure sensitive conductor could effectively follow up the repeated pressure application at the rate of five times a second (or the number of times that the minimum resistance of the conductor reached 3k$\Omega$ upon each pressure application).

Electrical hysteresis is a measure of the electrical characteristic of a pressure sensitive conductor. The smaller the value, the more desirable the conductor for practical use.

Next, the test pieces of pressure sensitive conductors were repeatedly subjected to pressures up to 7 kg/cm$^2$, and their resistances across the thickness were converted into potential differences and determined with the aid of an oscillograph. The results with Reference Example 1 and with Example 1 are summarized in FIG. 2. The frequency of repeated pressure application is plotted as abscissa and the resistance upon pressure application as ordinate. The numerical values affixed to the curves indicate the amounts of the titanate compound added in accordance with the invention. It will be understood from FIG. 1 and Table 1 that the test pieces according to this example show sharply increased frequencies of effective follow-ups and that their response velocities are also improved to more than about one millisecond.

EXAMPLE 2

To 64 ml of an addition reaction type silicone rubber ("KE1300T RTV" made by Shin-etsu Chemical Industry Co.) was added 29 ml (257 g) of copper particles ranging in size from about 70 to 100μ. The two were mixed in the same manner as in Example 1. Next, 6.4 ml of a mixture of a cross-linking catalyst for that silicone rubber (both made by Shin-etsu Chemical), and then 0.6 ml of diisopropyl dilauryl titanate (made by Alfa Chemical Co.) were added and mixed altogether. A pressure sensitive conductor sheet was formed of the mixture by the same procedure as described in Example 1. As Reference Example 2, another conductor was made in the same way as in Example 2 with the exception that no titanate compound was added. Following the procedure illustrated in FIG. 2, each of the test pieces thus obtained was subjected to a load of 3 kg/cm² repeatedly at a rate of five times a second, and the frequency of pressure application required to attain a minimum resistance of 3 KΩ was counted. The frequency with the test piece of Example 2 was about 70,000 (about 4 hours) and that with the test piece of Reference Example 2 was about 10,000 (about 33 minutes).

EXAMPLE 3

Seventy-four percent by volume of a condensation reaction type silicone rubber ("KE12 RTV" made by Shin-etsu Chemical Industry Co.), 20 drops of a cross-linking catalyst for the silicone rubber (also made by Shin-etsu Chemical), and 25% by volume of nickel particles ranging in size from about 50 to 70μ were mixed. To this system was added 0.7% by volume of one of the titanate compounds shown in Table 2. Thus, in the same manner as in Example 1, test pieces of pressure sensitive conductor were obtained. In Reference Example 3, the mixture of the same composition with the exception of the titanate compound gave no pressure sensitive conductor, and it was considered that part of the nickel particles had descended to the underside of the silicone rubber layer. After the addition of the titanate compounds shown in Table 2, the viscosities of the compounds were determined with a Weissenberg rheogonimeter (manufactured by Farol Research Engineers Ltd.), with the rate of strain set to about 1. Table 2 shows the results. In the other experiment tetrabutyl titanate was employed as a titanate compound, but it caused gelation of the silicone rubber during mixing and proved unsuitable for use in preparing a pressure sensitive conductor.

Table 2

Results of measurement of Example 1 and Reference Example 1

| | Titanate compound | Viscosity (poise) | P* (kg/cm²) | Frequency of effective follow-ups |
|---|---|---|---|---|
| Ref Ex 3 | None | $10^{4.3}$ | ∞ | Over 10000 |
| Ex. 3 | Triisopropyl stearoyl titanate | $10^{5.2}$ | 3.6 | " |
| | Diisopropyl lauryl titanate | $10^{5.4}$ | 3.4 | " |
| | Diisopropyl diacryloyl titanate | $10^{5.3}$ | 3.5 | " |
| | Triethyl methacryloyl titanate | $10^{5.7}$ | 3.3 | " |
| | Tributyl dodecylbenzene- | $10^{4.9}$ | 3.4 | " |

Table 2-continued

Results of measurement of Example 1 and Reference Example 1

| Titanate compound | Viscosity (poise) | P* (kg/cm²) | Frequency of effective follow-ups |
|---|---|---|---|
| sulfonyl titanate | | | |

EXAMPLE 4

Diisopropyl diacryloyl titanate and nickel particles were first mixed, and the mixture was added to silicone rubber (of a condensation reaction type). Otherwise the same procedure as in Example 3 was followed to obtain a pressure sensitive conductor. After a mixing time of about 20 minutes, results similar to those in Example 3 were obtained. In a further experiment, nickel particles about 100μ in size were mixed with the titanate compound and, in terms of the nickel particles, not more than 0.1% by volume of the mixture was mixed in a silicone rubber, and then the mixture was molded and formed into a 0.5 mm-thick sheet and cross-linked. A test piece of the sheet was allowed to swell in benzene, and the particle-rubber interface was examined in conformity with the procedure described in "Polymer Networks" (Teizo Kotani & S. S. Sternstein: "Structural and Mechanical Properties" edited by A. J. Chompft & S. Newman, pp. 273–291). No bond was found in the interface.

EXAMPLE 5

About 23.1 g of an addition reaction type filler contained silicone rubber ("KE1300 RTV" made by Shin-etsu Chemical Industry Co.) (sp. gr. 1.11), about 62.4 g of nickel particles ranging in size from about 3 to 7μ ("Type 123" nickel powder prepared by Inco Co.) (sp. gr. 8.85), 0.1 g of bis(triethanolamine) dipropyl titanate (sp. gr. 1.2) as a titanate compound (made by Alfa Chemical Co.) and 2.3 g of a cross-linking catalyst for the silicone rubber were weighed in advance.

Next, the silicone rubber and nickel particles were fed to a twin rotor mixer and were thoroughly mixed at a velocity of about 100 rpm for about 25 minutes. Following this, the titanate compound was added and, 2 minutes later, the cross-linking agent was added. They were mixed for 5 minutes.

The mixture thus obtained was poured into 1-millimeter-deep molds, and kept still for about 30 minutes in magnetic fields of varying strengths as shown in Table 3. The test pieces were taken out, allowed to stand for 1 full day at room temperature, and then dried in a nitrogen atmosphere at 100° C. for 35 hours.

The measured values of sensitivity P* and durability of the test pieces are given in Table 3.

Table 3

| Strength of magnetic field (gauss) | P*[1] (kg/cm²) | Freqeuncy of effective follow-ups[2] |
|---|---|---|
| 0 | 8.9 | $5.7 \times 10^3$ |
| 200 | 6.0 | $6.1 \times 10^3$ |
| 500 | 4.2 | $9.9 \times 10^3$ |
| 1000 | 3.4 | $8.9 \times 10^3$ |
| 2500 | 3.5 | $9.9 \times 10^3$ |

Notes: [1] [2] Both signify the same as in Example 1.

When subjected to the magnetic field, each test specimen showed a sharp decrease of the P* value (that is, attained increased sensitivity) and an increased frequency of effective follow-ups (or improved durability). The favorable effect of the magnetic field is all the more pronounced when it is combined with the use of a titanate compound.

EXAMPLE 6

On a twin rotor mixer having a capacity of 100 ml (manufactured by Tosoku Seimitsu Kogyo Co.), 168 g (about 20% by volume) of nickel particles having a particle size of about 20 to 30μ (hydrogen-pressure-reduction nickel particles prepared by Sherritt Gordon Co.) was added to 104 g (about 80% by volume) of a condensation reaction type silicone rubber ("KE12 RTV" made by Shin-etsu Chemical Industry Co.) premixed with about 12% by weight of calcium carbonate. After mixing for 5 minutes, 16 drops of a cross-linking catalyst for the silicone rubber (made by Shin-etsu Chemical) were added and mixed together for 1 minute. With the further addition of 0.3 ml of isopropyl triiostearoyl titanate (made by Kenrich Petrochemicals, Inc.), mixing was continued for 5 more minutes. The mixture was poured into a 1-millimeter-deep mold and allowed to stand for 1 full day while subjected to parallel magnetic fields. Thereafter, the resulting sheet was heated at 120° C. for 1 hour to conclude its curing.

As Reference Example 4, a pressure sensitive conductor was formed in the same way as in Example 6 except that no isopropyl triisostearoyl titanate was added.

From the sheets of this example and Reference Example 4 thus obtained, test pieces were cut out by a circular cutter to a circular shape having an area of one square centimeter each and also by a rectangular cutter to a strip 5 cm by 5 mm each. The circular test pieces were used in determining their electrical properties, and the strips were used for mechanical strength tests.

With an Instron type universal tester (manufactured by Shimadzu Seisakusho, Ltd.) the test pieces were tested for their tensile strength and elongation. The results are given in Table 4. Also, the test pieces were repeatedly subjected to pressures up to 7 kg/cm$^2$ at a rate of five times a second, and their resistances across the thickness were converted into potential differences and determined by means of an oscillograph. The frequencies of repeated pressure application until the minimum resistance reached 1.5 kΩ upon pressure application were determined. The results are also shown in Table 4.

Table 4

| Results of measurement of Example 6 and Reference Example 4 | | | |
|---|---|---|---|
| | | Example 6 | Ref Ex 4 |
| Tensile strength | (kg/cm$^2$) | 32 | 17 |
| Elongation | (%) | 208 | 120 |
| P*[1)] | (kg/cm$^2$) | 5.7 | 5.4 |
| Frequency of repeated pressure application[2)] | | 1 × 10$^4$ | 2 × 10$^3$ |

Notes: [1)]Pressure required to be applied to the test piece until its volume resistivity (ρv — Ω · cm reached 10$^3$Ω · cm (in kg/cm$^2$).
[2)]Frequency of repeated application of a pressure (7 kg/cm$^2$) at a rate of five times a second, required by the test piece until its resistance increased to 1.5 kΩ upon pressure application.

EXAMPLE 7

Silica aerogel was added, in varying amounts as in Table 5, to given amounts of an addition reaction type silicone rubber free of any filler (made by Shin-etsu Chemical Industry Co.) and a cross-linking catalyst for that silicone rubber. To 65.5 ml of each mixture were added 222.5 g of reduced copper particles ranging in size from 70 to 120μ (sp. gr. 8.92) and 0.5 g of isopropyl trimethacryloyl titanate (sp. gr. 1.2) and they were mixed altogether under reduced pressure on a 100-ml twin rotor mixer. In the same manner as described in Example 6 the test pieces were tested for their mechanical and electrical properties. The results are shown in Table 5. As Reference Example 5, a test piece free of the titanate compound was prepared. Their test results are also shown in the same table.

Table 5

| Results of measurements of Example 7 and Reference Examples 5 and 6 | | | | |
|---|---|---|---|---|
| Test piece | Rubber /silica (wt ratio) | Tensile strength (kg/cm$^2$) | Elongation (%) | P* (kg/ cm$^2$) | Frequency of repeated pressure application |
| Ex. 7 | 97/3 | 25 | 160 | 5.3 | 6 × 10$^2$ |
| | 90/10 | 30 | 210 | 4.5 | 3 × 10$^3$ |
| | 80/20 | 33 | 200 | 4.1 | 4 × 10$^3$ |
| | 55/45 | 37 | 200 | 3.8 | 3 × 10$^3$ |
| Ref Ex 5 | 90/10 | 20 | 110 | 5.0 | 2 × 10$^2$ |

Note: [1)]10 wt % of cross-linking catalyst was added to Rubber.

EXAMPLE 8

Half a gram each of the titanate compounds (sp. gr. 1.2) shown in Table 6 were added to mixture portions, each of which consisted of 96.2 g of a condensation reaction type silicone rubber containing the same calcium carbonate-containing silicone rubber as used in Example 6 ("KE12 RTV" made by Shin-etsu Chemical Industry Co.) (sp. gr. 1.30), 20 drops of a cross-linking catalyst for the silicone rubber (also made by Shin-etsu Chemical), and 214 g of nickel particles about 10μ in particle size (sp. gr. 8.85). In the same manner as described in Example 6, the mechanical and electrical properties of the test pieces were determined. The results are given in Table 6. As Reference Example 6, a test piece of the same composition as Example 8 but free of the titanate was prepared. Its test results are also shown.

Table 6

| Results of measurements of Example 8 and Reference Example 6 | | | | |
|---|---|---|---|---|
| Titanate compound in test piece | Tens str (kg/cm$^2$) | Elong (%) | P* (kg/cm$^2$) | Freq of repeated pressure applicn |
| Isopropyl trilauryl titanate | 35 | 180 | 4.7 | 6 × 10$^3$ |
| Isopropyl tri(dodecyl-benzenesulfonyl) titanate | 30 | 180 | 4.4 | 5 × 10$^3$ |
| Isopropyl tri(di-isooctylphosphate) titanate | 35 | 200 | 4.5 | 8 × 10$^3$ |
| Isopropyl triacryloyl titanate | 35 | 240 | 4.5 | 8 × 10$^3$ |
| None (Ref Ex 6) | 17 | 100 | 5.3 | 1 × 10$^3$ |

What is claimed is:

1. A pressure sensitive conductor containing from 62 to 91.9% by volume of a molded, cured silicone rubber; from 8 to 35% by volume of electrically conductive metal particles; and from 0.1 to 3% by volume of an alkyl titanate compound selected from the group consisting of monoalkyl, dialkyl, and trialkyl titanate compounds, an alkyl group containing up to four carbon atoms.

2. A pressure sensitive conductor according to claim 1 containing a dialkyl titanate compound, a trialkyl titanate compound, or a mixture thereof.

3. A pressure sensitive conductor according to claim 2 wherein the dialkyl and trialkyl titanate compounds are represented by the formula $$(RO)_n Ti(OR^3)_{4-n}$$

where n is 2 or 3, R is an alkyl group having from one to four carbon atoms, and $R^3$ is a triethanolamine residue, acryloyl or methacryloyl group, or an acyl, aroyl or alkylbenzenesulfonyl group, an alkyl group having from six to 20 carbon atoms.

4. A pressure sensitive conductor according to claim 2 wherein the dialkyl titanate compound is at least one compound selected from the group consisting of bis(triethanolamine)diisopropyl titanate, bis(triethanolamine)dibutyl titanate, bis(triethanolamine)diethyl titanate, bis(triethanolamine)dimethyl titanate, diisopropyl dilauryl titanate, diisopropyl laurylmyristyl titanate, diisopropyl distearoyl titanate, diisopropyl stearoylmethacryloyl titanate, diisopropyl diacryloyl titanate, diisopropyl didodecylbenzenesulfonyl titanate, and diisopropyl isostearoyl-4-aminobenzoyl titanate.

5. A pressure sensitive conductor according to claim 2 wherein said trialkyl titanate compound is at least one compound selected from the group consisting of triisopropyl acryloyl titanate, triethyl methacryloyl titanate, triisopropyl myristyl titanate, tributyl dodecylbenzenesulfonyl titanate, triisopropyl stearoyl titanate, and triisopropyl isostearoyl titanate.

6. A pressure sensitive conductor according to claim 2 wherein said dialkyl titanate compound is at least one compound selected from the group consisting of bis(triethanolamine)diisopropyl titanate, diisopropyl dilauryl titanate, and diisopropyl diacryloyl titanate.

7. A pressure sensitive conductor according to claim 2 wherein said trialkyl titanate compound is at least one compound selected from the group consisting of triisopropyl stearoyl titanate, triethyl methacryloyl titanate, and tributyl dodecylbenzenesulfonyl titanate.

8. A pressure sensitive conductor according to claim 1 wherein said silicone rubber contains a filler.

9. A pressure sensitive conductor according to claim 8 wherein said filler is at least one member selected from the group consisting of colloid silica, silica aerogel, kaolin, mica, talc, wollastonite, calcium silicate, aluminum silicate, chalk, calcium carbonate, magnesium carbonate, iron oxide, alumina, and clay.

10. A pressure sensitive conductor according to claim 8 wherein said filler is at least one member selected from the group consisting of colloid silica, silica aerogel, alumina, aluminum silicate, calcium carbonate, and kaolin.

11. A pressure sensitive conductor according to claim 8 wherein the filler is used in amount of up to about 45% on the basis of the rubber volume.

12. A pressure sensitive conductor according to claim 1 wherein the silicone rubber contains at least one additive selected from the group consisting of pigment, coloring agent, stabilizer, foaming agent and silicone oil.

13. A pressure sensitive conductor according to claim 1 containing a monoalkyl titanate compound.

14. A pressure sensitive conductor according to claim 1 wherein said monoalkyl titanate compound contains a filler and are represented by the formula $$(RO)Ti(O\!-\!\underset{\underset{O}{\|}}{C}\!-\!R^1)_3,$$

$(RO)Ti(O\!-\!R^2)_3$, or
$(RO)Ti(OX\!-\!R^2)_3$ where R is an alkyl group having from one to four carbon atoms; $R^1$ is a vinyl group, α-alkyl-substituted vinyl group, or an alkyl, aralkyl, or allyl group having from six to 20 carbon atoms, $R^2$ is an alkyl, aralkyl, or allyl group having from six to 20 carbon atoms; and X is $$-\underset{\underset{O}{\|}}{S}-\ \text{or}\ -\underset{\underset{O}{\|}}{P}-.$$

15. A pressure sensitive conductor according to claim 14 wherein said monoalkyl titanate compound is at least one compound selected from the group consisting of isopropyl triisostearoyl titanate, isopropyl trilauryl titanate, isopropyl trimyristyl titanate, isopropyl dimethacryloyl isostearoyl titanate, isopropyl tri(dodecylbenzenesulfonyl) titanate, isopropyl isostearoyl diacryloyl titanate, isopropyl tri(diisooctylphosphate) titanate, isopropyl trimethacryloyl titanate, isopropyl tri(dioctylpyrophosphate) titanate, isopropyl triacroyl titanate, isopropyl tri(dioctylphosphite) titanate, butyl triisostearoyl titanate, and ethyl triisostearoyl titanate.

16. A pressure sensitive conductor according to claim 14 containing up to about 45% by volume of filler on the basis of the volume of said silicone rubber.

17. A pressure sensitive conductor according to claim 1 wherein the electrically conductive metal particles are particles of silver, copper, cobalt, nickel, brass, iron, chromium, titanium, platinum, gold, aluminum, zinc or their alloys.

18. A pressure sensitive conductor according to claim 1 wherein the electrically conductive metal particles are particles of silver, copper, nickel, cobalt, chromium, brass, iron, or their alloys.

19. A pressure sensitive conductor according to claim 1 wherein the electrically conductive metal particles are particles of cobalt, nickel, iron or their alloys.

20. A pressure sensitive conductor according to claim 1 wherein a size of the electrically conductive metal particles is within the range of between 0.1 and 200μ.

21. A pressure sensitive conductor according to claim 1 wherein a size of electrically conductive metal particles is within the range of between 1 and 150μ.

* * * * *